Oct. 19, 1954 R. C. MORRIS 2,691,898
TENSION LINK CENTERING DEVICE
Filed Feb. 2, 1953
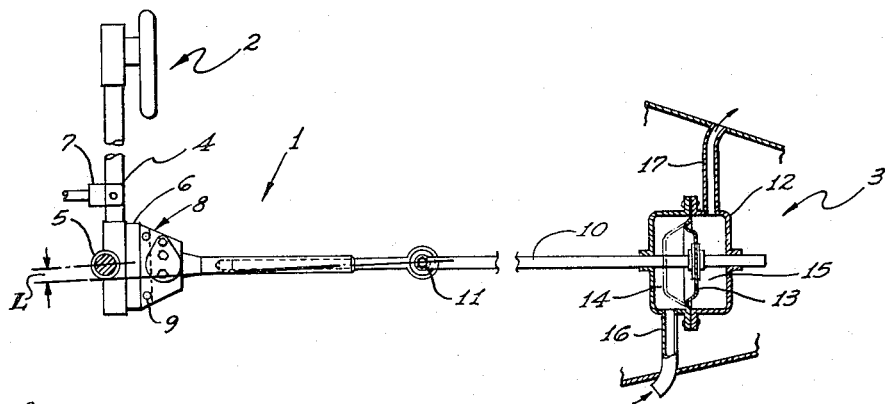
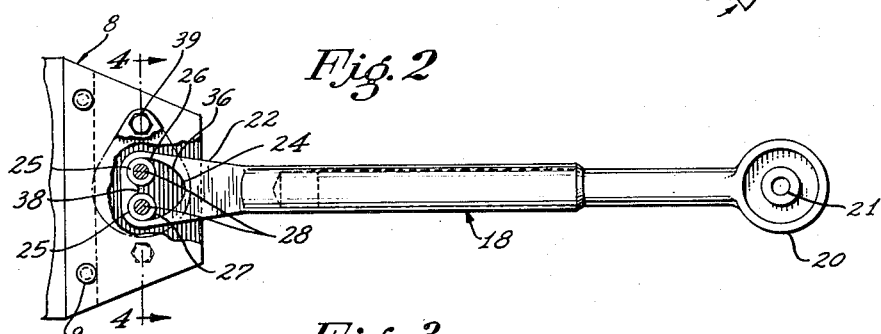
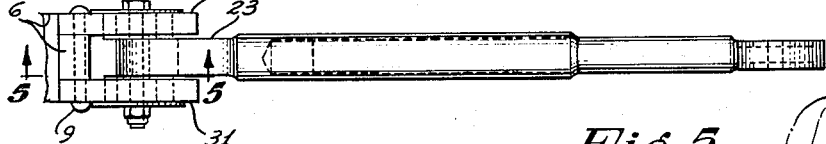
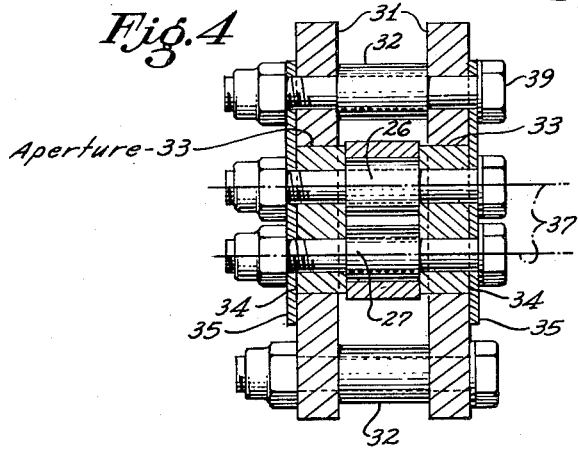
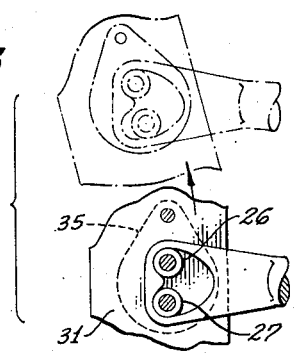
INVENTOR:
Robert C. Morris
By Hubert E. Metcalf
His Patent Attorney Patented Oct. 19, 1954

2,691,898

UNITED STATES PATENT OFFICE 2,691,898

TENSION LINK CENTERING DEVICE

Robert C. Morris, Los Angeles, Calif., assignor to Northrop Aircraft, Inc., Hawthorne, Calif., a corporation of California Application February 2, 1953, Serial No. 334,685

8 Claims. (Cl. 74—469)

This invention relates to centering devices and more particularly to a linking member embodying a centering portion so constructed that a positive centering force is obtained when the linking member is in its neutral position.

The position and movement of certain parts of a machine or mechanical apparatus are frequently controlled by the movement of other parts of the same machine or apparatus. In such instances it is conventional practice to connect the component parts by means of a centering linkage which will return a first part to a neutral or predetermined position, under the influence of a second part, when the first part is free of forces other than those exerted by the second part. An example of such a linkage is that connecting the control element of an airplane and an associated control force producer.

Normally such linkages comprise a pair of linking members pivotally attached at their adjacent ends, the linking members assuming a straight line relationship when the link is in its neutral or dead center position but is free to jackknife under the influence of external forces. Such a device is conspicuously non-sensitive in its dead center position and in the range immediately adjacent its dead center position, this because it pivots about a single point and does not provide any appreciable positive centering force in the above range.

Accordingly, it is an object of the present invention to provide a novel centering link so constructed that a positive centering force is obtained when the link is in its neutral and near neutral position.

Another object is to provide a novel centering link so constructed to eliminate the "dead feel" adjacent its neutral and near neutral position.

A better understanding of the invention will become apparent from the following description and drawing. It is to be expressly understood, however, that the following description and drawing is for purposes of illustration only and not a definition of the limits of the invention, reference being had for this purpose to the appended claims. In the drawings:

Figure 1 is an elevational view of a preferred embodiment of the centering link as disclosed in the invention, the same being shown in combination with an airplane control unit and control force producer.

Figure 2 is an enlarged elevational view of the centering link shown in Figure 1.

Figure 3 is a plan view of the centering link shown in Figure 2.

Figure 4 is a sectional view of the centering link shown in Figure 2 taken on the line 4—4 thereof.

Figure 5 is a sectional view of the centering view shown in Figure 3 taken on the line 5—5 thereof.

Referring to Figure 1, a preferred embodiment of the present invention is shown, in which a positive centering link 1 is illustrated connecting a control unit 2 of an airplane and its associated force producer 3, although the centering link is shown and disclosed in connection with specific mechanical structure it is obvious it may be used with any type of apparatus where a positive centering link is required without departing from the spirit of the invention.

Control unit 2 constitutes a conventional pilot's control column 4 utilized for positioning various control surfaces of an airplane (not shown). Control column 4 pivots about shaft 5 and has a plate element 6 rigidly fixed to its lower end extending at right angles thereto. A link 7, pivotally connected to column 4, functions to impart movement to control surfaces (not shown) to which it may be attached. The outer portion of the plate element is fixedly secured to an attach element 8 of the centering link 1 by means of bolts or rivets 9. The other end of the centering link is pivotally attached to one end of a rod 10, by means of a pin 11, comprising an element of the force producer.

The force producer 3 constitutes no part of the present invention, therefore it is only briefly described. The force producers function in an airplane is to induce synthetic "feel" of airloads in the plane's control system, this in the absence of directly connected controls, and also to return the control column 4 to its neutral or central position. The rod 10 extends through and is slidable in a chamber 12, fixed to the rod inside the chamber is a diaphragm 13 dividing the chamber into two separate pressure tight compartments 14 and 15. Compartment 14 is subject to ram air at super-atmospheric pressure through a conduit 16, compartment 15 is subjected to atmospheric air at static pressure through a conduit 17, thus a pressure differential is created between the two compartments, the pressure differential being proportional to the speed of the airplane and urges the diaphragm 13 and rod 10 to the right. Inasmuch as the diaphragm and rod are urged away from the control column 4, at all times during the forward progress of the plane with which it is associated, it is apparent that the various members of the centering link will be subject to tension during this period.

The centering link 1 may be considered as comprising generally a rod member 18 and the attach element 8.

The rod member 18 is provided with a boss 20 and an eye 21 adjacent one of its ends, the eye 21 accommodating the pin 11 by means of which the rod member is pivotally attached to rod 10. The other end portion 22 of the rod is slightly larger than its body portion and preferably rectangular in cross-section, the generally triangularly shaped faces 23 being located in planes at right angles to the axis of eye 21. Portion 22 of the rod is provided with a generally heart shaped aperture 24 which provides bearing surfaces 25 for a pair of rollers 26 and 27, the latter comprising component parts of the attach element. The axes 28 of the bearing surfaces are parallel to the axis of eye 21.

The attach element 8 comprises a pair of spaced plates 31, one plate being positioned on each side of plate 6 and secured thereto as previously described. The relative distance between that portion of plates 31 extending beyond plate 6 is maintained by spacers 32 positioned between the plates and held in position by suitable bolts. Circular apertures 33 are provided in plates 31, the center of each aperture being located on a common line normal to the surface of plates 31, the apertures accommodating disk elements 34 which are relatively spaced by rollers 26 and 27.

The disks 34, rollers 26 and 27, and a pair of plates 35 generally of tear-drop configuration, are secured in relative position with respect to themselves and plates 31 by means of suitable bolts. The rollers 26 and 27 are preferably made of a "super-oilite" material and are provided with lapped surfaces, since they seat in surfaces 25 formed in aperture 24 and also roll on arcuate surfaces 36 as the centering link is moved from its neutral position.

The distance between axes 28 of the bearing surfaces 25 is substantially the same as the distance between axes 37 of the rollers, the diameter of the rollers and their mating bearing surfaces being equal. The distance between the axes 37 of the rollers may be slightly less than the distance between axes 28 of their bearing surfaces if desired, this construction permits the rollers to bottom on their bearing surfaces adjacent projection 38 and eliminates the sharp bottoming feeling of a detent. The arcuate surfaces 36 are arcs of circles, the center of the arcuate surfaces being coincident with axes 28 of the bearing surfaces 25, and their radii being such that the outer cylindrical surface of one of the rollers is in contacting relationship with one of the surfaces 36 at all times when the link is not in its neutral position. This construction precludes the possibility of back lash or lost motion in the link.

With the centering link assembled and attached to the control element and force producer the following adjustment is made. With the diaphragm in its neutral position, as shown in Figure 1, the plates 35, disk elements 34, and rollers 26 and 27 are rotated about the axes of the disks until each roller is properly bottomed in its respective bearing surface. A hole is then drilled through the pointed portion of plates 35 and 31 accommodating a bolt 39 which secures the rollers in proper position with respect to their bearing surfaces.

From the above, it is apparent a positive centering force is present when the centering link is in its neutral position. The diaphragm 13 and rod 10 are urged to the right (Figure 1) at all times during the forward progress of the plane, the force exerted on the diaphragm subjects the centering link to a force inducing tension in its various parts during this time. This force is transmitted through the axis of pin 11 and the axes of the rollers 26 and 27, a line drawn through these points show that these forces have a moment arm L with respects the pivot point of the control column 4. Thus it is seen a pair of equal and opposite moments are present tending to rotate the control column in a clockwise and counter-clockwise direction, these two moments effectively maintain the link in its neutral or centered position.

As the centering link is moved slightly from its centered position all forces present in the link are transferred to one of the rollers thus providing an appreciable amount of "feel" in the control unit, this "feel" is particularly desirable if the link connects elements one of which is manually actuated as in the present embodiment. As the link is moved further from its centered position, as shown by dotted construction in Figure 5, one of the rollers, viz., the one on the side in the direction of the motion remains in its bottomed position, the other roller remains in contact with arcuate surface 36 and rolls thereon. Although the above construction provides greater centering forces near the links neutral position, as compared with a conventional type centering link employing only one pivot point, it is apparent these forces are not materially altered at greater angles.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. A device of the class described comprising: a pair of aligned members having overlapping and spaced portions; pivotal attaching means on each of said spaced portions; securing means pivotally attaching said overlapping portions to each other to permit relative angular movement therebetween; said securing means comprising a pair of spaced bearing members in one of said pair of members and a pair of spaced bearing surfaces in the other of said pair of members; said pair of aligned members having a centered position in which said bearing members are bottomed in said bearing surfaces and said bearing members and surfaces are located an equal distance on opposite sides of a line extending between the axes of said pivotal attaching means; said securing means being effective to resist forces which may act on said pair of aligned members subjecting them to tensile stress and tending to move them in opposite directions away from said securing means and toward said attaching means.

2. A device as set forth in claim 1; further characterized in that each of said bearing members comprises a cylindrical roller; and each of said bearing surfaces constitutes a concave surface of cylindrical configuration comprising wall portions of an aperture formed in the other of said pair of members.

3. A device as set forth in claim 2; further characterized in that wall portions of said aperture comprise a pair of major wall portions coinciding with surfaces generated by one side of a rectangle rotated about the parallel side thereof as an axis when the latter coincides with first one of the axes of one of said bearing surfaces and then the other of said bearing surfaces, respectively.

4. A device as set forth in claim 3; further characterized in that said pair of aligned members has a plurality of non-centered positions in which one of said bearing members is bottomed in one of said bearing surfaces and the other of said bearing members is removed from the other one of said bearing surfaces and is in contact with one of said major wall portions.

5. A device of the class described comprising: a pair of aligned members each having an axis of symmetry and having overlapping and spaced ends; pivotal attaching means in each of said spaced ends; securing means pivotally attaching said overlapping ends to each other to permit relative angular movement therebetween; said securing means comprising a pair of spaced identical bearing members in one of said pair of members and a pair of spaced identical concave bearing surfaces of cylindrical configuration in the other one of said pair of members; said pair of aligned members having a centered position in which said bearing members are bottomed in said bearing surfaces and the axes of symmetry of said pair of members coincide with a common axis which extends between and intersects the axes of said attaching means; the axes of said bearing surfaces being located equal distances on opposite sides of said common axis when said pair of aligned members are in said centered position; said securing means being effective to resist forces which may act on said pair of aligned members subjecting them to tensile stress and tending to move them in opposite directions away from said securing means and toward said attaching means.

6. A device as set forth in claim 5; further characterized in that each of said bearing members comprises a cylindrical roller having a diameter equal to the diameter of said bearing surfaces and each of said bearing surfaces constituting a wall portion of an aperture formed in the other of said pair of members.

7. A device as set forth in claim 6; further characterized in that wall portions of said aperture comprise a pair of major wall portions coinciding with surfaces generated by one side of a rectangle rotated about the parallel side thereof as an axis when the latter coincides with one of the axes of one of said bearing surfaces and then the other of said bearing surfaces, respectively; the radius of the surface generated by said one side of said rectangle equalling the distance between the axes of said bearing surfaces plus the radius of one of said bearing surfaces.

8. A device as set forth in claim 7; further characterized in that said pair of aligned members has a plurality of non-centered positions in which one of said bearing members is bottomed in one of said bearing surfaces and the other of said bearing members is removed from the other one of said bearing surfaces and is in contact with one of said major wall portions.

References Cited in the file of this patent

UNITED STATES PATENTS

| Number | Name | Date |
|---|---|---|
| 755,734 | Barrow | Mar. 29, 1904 |
| 2,328,266 | Durbin | Aug. 31, 1943 |
| 2,588,914 | Dunham | Mar. 11, 1952 |
| 2,616,714 | Cubberly | Nov. 4, 1952 |